(12) United States Patent
Woefle

(10) Patent No.: US 11,866,576 B2
(45) Date of Patent: Jan. 9, 2024

(54) FORMALDEHYDE-FREE BINDER COMPOSITION

(71) Applicant: WACKER CHEMIE AG, Munich (DE)

(72) Inventor: Heimo Woefle, Traunstein (DE)

(73) Assignee: Wacker Chemie AG, Munich (DE)

( * ) Notice: Subject to any disclaimer, the term of this patent is extended or adjusted under 35 U.S.C. 154(b) by 285 days.

(21) Appl. No.: 17/251,642

(22) PCT Filed: Mar. 27, 2019

(86) PCT No.: PCT/EP2019/057764
§ 371 (c)(1),
(2) Date: Dec. 11, 2020

(87) PCT Pub. No.: WO2020/192912
PCT Pub. Date: Oct. 1, 2020

(65) Prior Publication Data
US 2022/0002533 A1    Jan. 6, 2022

(51) Int. Cl.
| C08L 31/04 | (2006.01) |
| C08J 5/24 | (2006.01) |
| D04H 3/12 | (2006.01) |
| D04H 1/587 | (2012.01) |

(52) U.S. Cl.
CPC .................. *C08L 31/04* (2013.01); *C08J 5/24* (2013.01); *D04H 1/587* (2013.01); *D04H 3/12* (2013.01); *C08J 2331/04* (2013.01); *C08J 2433/02* (2013.01); *C08J 2433/26* (2013.01)

(58) Field of Classification Search
None
See application file for complete search history.

(56) References Cited

U.S. PATENT DOCUMENTS

| 10,457,827 B2 | 10/2019 | Künstle et al. |
| 2013/0149927 A1* | 6/2013 | Boylan ................. D04H 1/587 524/428 |

FOREIGN PATENT DOCUMENTS

| CN | 1944485 A | 4/2007 |
| CN | 108301198 A | 7/2018 |
| CN | 106536663 B | 8/2018 |
| EP | 0389893 A2 | 10/1990 |
| EP | 0184153 B1 | 7/1991 |
| EP | 0609849 A1 | 8/1994 |
| EP | 0596318 B1 | 9/1998 |
| JP | 2008297523 A | 12/2008 |
| WO | 2013085764 A1 | 6/2013 |
| WO | 2013124417 A1 | 8/2013 |
| WO | 2015067621 A1 | 5/2015 |
| WO | 2017189350 A1 | 11/2017 |
| WO | 20160754 A1 | 8/2020 |

* cited by examiner

*Primary Examiner* — Tae H Yoon
(74) *Attorney, Agent, or Firm* — BROOKS KUSHMAN P.C.

(57) ABSTRACT

Aqueous binder compositions for binding fibers comprise a vinyl acetate-ethylene copolymer of 60 to 94% by weight vinyl acetate, 5 to 30% by weight ethylene and 0 to 20% by weight of further ethylenically unsaturated comonomers copolymerizable therewith, polymerized in the presence of polyvinyl alcohol in aqueous medium, wherein the polymerization is carried out in the presence of a copolymer B) containing 20 to 50% by weight of monomer units derived from ethylenically unsaturated carboxamides, 20 to 50% by weight of monomer units derived from ethylenically unsaturated monocarboxylic acids, and 20 to 50% by weight of monomer units derived from ethylenically unsaturated dicarboxylic acids or anhydrides thereof.

16 Claims, No Drawings

FORMALDEHYDE-FREE BINDER COMPOSITION

CROSS REFERENCE TO RELATED APPLICATIONS

This application is the U.S. National Phase of PCT Appln. No. PCT/EP2019/057764 filed Mar. 27, 2019, the disclosure of which is incorporated in its entirety by reference herein.

BACKGROUND OF THE INVENTION

1. Field of the Invention

The invention relates to a formaldehyde-free binder composition and use thereof for producing textile fabrics.

2. Description of the Related Art

Binder compositions for textile fabrics generally comprise polymers based on ethylenically unsaturated monomers as binder components and are usually in the form of an aqueous dispersion. The polymers usually comprise units of crosslinking monomers and can therefore crosslink with one another and optionally also with fibers and thus contribute to the formation of textile fabrics with higher strength. As a result, permanent fixation of the fibers and an increase in the resistance of the textile fabric to mechanical stress can be achieved. Textile fabrics are also known by the term nonwovens and can be produced, for example, by the airlay, wetlay or spunlay processes.

In industrial practice, polymers comprising predominantly N-methylolacrylamide units (NMA) have prevailed as binder components. N-methylolacrylamide groups can react with the OH groups of cellulose or starch and consequently result in covalent bonds between binder polymer and fiber. It is disadvantageous that formaldehyde is formed in the course of crosslinking of such polymers, which should be avoided for toxicological reasons. In addition, as a result of their production, such polymers comprise formaldehyde as an accompanying substance in many cases, for example when they are produced by means of polymerization using formaldehyde-releasing initiators, such as sodium formaldehyde sulfoxylate.

There is therefore a need to minimize the formaldehyde content in the binder compositions and to make textile fabrics accessible in an efficient manner that are as free of formaldehyde as possible.

In EP 0 596 318 B1, ascorbic acid is used as a reducing agent in the redox initiator system instead of sodium formaldehyde sulfoxylate to reduce the formaldehyde in an aqueous polymer dispersion during the polymerization. WO 2013/124417 A1 describes an NMA-containing nonwoven binder in which the N-methylolacrylamide monomer units have been partially replaced with acrylamide monomer units. The use of vinyl acetate-ethylene copolymers stabilized with polyvinyl alcohol and with a combination of N-methylolacrylamide and acrylamide comonomer units is known from WO 2017/189350 A1. WO 2013/085764 A1 describes a fiber binder based on a vinyl acetate-ethylene copolymer dispersion stabilized with polyvinyl alcohol, which does not comprise N-methylolacrylamide, and which comprises ammonium chloride to improve the wet strength of the binder. WO 2015/067621 A1 describes nonwoven binders which, instead of NMA monomer units, have a combination of epoxy-containing monomer units and silane-containing monomer units. EP 0 609 849 A1 describes a nonwoven binder in the form of an aqueous, emulsifier-stabilized dispersion of a vinyl acetate-ethylene copolymer with N-butoxymethylacrylamide and acrylamide monomer units. EP 0 184 153 B1 describes formaldehyde-free latex binders stabilized with an anionic emulsifier and based on acrylic ester copolymers with acrylamide and dicarboxylic acid monomer units. JP 2008-297523 A describes adhesives based on vinyl acetate-ethylene copolymers stabilized with polyvinyl alcohol, which also comprise comonomer units derived from acrylamide and acrylic acid. The PCT application with the application number PCT/EP2019/052740 describes formaldehyde-free binders based on vinyl acetate-ethylene copolymers stabilized with polyvinyl alcohol which also comprise comonomer units derived from acrylamide, acrylic acid and maleic anhydride.

The object of the invention was to provide an aqueous binder for binding fibers which, even without addition of crosslinking catalyst, results in high wet strength of the fiber composite without releasing formaldehyde.

SUMMARY OF THE INVENTION

The invention relates to an aqueous binder composition for binding fibers comprising a vinyl acetate-ethylene copolymer A), obtainable by means of radically initiated polymerization of a1) 60 to 94% by weight vinyl acetate, a2) 5 to 30% by weight ethylene and a3) 0 to 20% by weight of further ethylenically unsaturated comonomers copolymerizable therewith, in the presence of polyvinyl alcohol in aqueous medium, characterized in that the polymerization is carried out in the presence of a copolymer B) having b1) 20 to 50% by weight of monomer units derived from ethylenically unsaturated carboxamides, b2) 20 to 50% by weight of monomer units derived from ethylenically unsaturated monocarboxylic acids, b3) 20 to 50% by weight of monomer units derived from ethylenically unsaturated dicarboxylic acids or anhydrides thereof, where the figures in % by weight for the monomers a1), a2) and a3) add up to 100% by weight, and the figures for % by weight for the monomer units b1), b2) and b3) add up to 100% by weight.

DESCRIPTION OF THE PREFERRED EMBODIMENTS

Preferably, a1) 70 to 85% by weight vinyl acetate, based on the total weight of the comonomers, are copolymerized.

Preferably, a2) 15 to 28% by weight ethylene, based on the total weight of the comonomers, are copolymerized.

Preferred ethylenically unsaturated comonomers a3) are vinyl esters having 3 to 12 carbon atoms in the carboxylic acid radical such as vinyl propionate, vinyl laurate, vinyl esters of alpha-branched carboxylic acids having 9 to 13 carbon atoms such as VeoVa9® or VeoVa10® (trade names of Hexion). Preference is also given to (meth)acrylic esters of unbranched or branched alcohols having 1 to 15 carbon atoms, in particular n-butyl acrylate, 2-ethylhexyl acrylate or methyl methacrylate. Preference is also given to vinyl chloride, ethylenically unsaturated carboxylic acids such as acrylic acid, ethylenically unsaturated sulfonic acids and salts thereof such as vinylsulfonic acid or 2-acrylamidopropanesulfonic acid.

The vinyl acetate-ethylene copolymers A) preferably do not comprise any N-methylol(meth)acrylamide units or N-(alkoxymethyl) (meth) acrylamide units.

For the copolymer B), preferred monomer units b1) are obtained with acrylamide and/or methacrylamide and/or maleamic acid, particularly preferably with acrylamide. Preference is given to copolymerizing 30 to 40% by weight of monomer units b1) derived from ethylenically unsaturated carboxamides. Preferred monomer units b2) are obtained with acrylic acid and/or methacrylic acid, particularly preferably with acrylic acid. Preference is given to copolymerizing 30 to 40% by weight of monomer units b2) derived from ethylenically unsaturated monocarboxylic acids. Preferred monomer units b3) are obtained with maleic anhydride and/or maleic acid, particularly preferably with maleic anhydride. Preference is given to copolymerizing 20 to 30% by weight of monomer units b3) derived from ethylenically unsaturated dicarboxylic acids or anhydrides thereof. The copolymer B) with the monomer units b1), b2) and b3) is preferably obtained by means of radically initiated polymerization in water, on completion of which the copolymer is in aqueous solution. This solution is then used in the preparation of the vinyl acetate-ethylene copolymer A).

The vinyl acetate-ethylene copolymer A) is produced by means of radically initiated polymerization. The preparation can be carried out in a manner known per se, for example by the suspension polymerization process or, preferably, by the emulsion polymerization process in water. The polymerization temperature is generally 20° C. to 120° C. and the process is carried out under pressure, generally between 5 bar and 100 bar. The polymerization can be initiated with the water-soluble or monomer-soluble initiators or redox initiator combinations customary for emulsion polymerization or suspension polymerization. As reducing agents, preference is given to ascorbic acid, isoascorbic acid or salts thereof or formaldehyde-free reducing agents such as 2-hydroxy-2-sulfinatoacetic acid disodium salt (Bruggolite FF6). Persulfate compounds and peroxide compounds are preferred as oxidizing agents, particularly ammonium or alkali metal persulfates or hydrogen peroxide. The initiators used are preferably substances that do not release any formaldehyde, such as formaldehyde sulfoxylates.

The copolymer B) can be initially charged as a whole prior to the start of the polymerization or can be initially charged in portions and the remainder can be metered in during the polymerization. It is also possible to proceed in such a way that in an upstream step the comonomers b1), b2) and b3) are polymerized quasi in situ in aqueous solution to form the copolymer B), and then the polymerization to produce the vinyl acetate-ethylene copolymer A) is initiated. The vinyl acetate-ethylene copolymer A) is preferably prepared in the presence of 0.5 to 15% by weight, more preferably 0.5 to 5% by weight of the copolymer B), based on the total weight of the comonomers a1), a2) and a3). A particular advantage of the binder composition according to the invention is that the functional comonomer units b1), b2) and b3) are present as a "prepolymer" in the production of the vinyl acetate-ethylene copolymer A) and are therefore incorporated into the binder composition in larger amounts than would be possible with a copolymerization with vinyl acetate and ethylene.

The polymerization is preferably carried out in the presence of 1 to 10% by weight, based on the total weight of the comonomers, of one or more polyvinyl alcohols having a degree of hydrolysis of 80 to 99 mol %, preferably 85 to 90 mol %, more preferably 87 to 89 mol %. The Hoppler viscosity in a 4% aqueous solution of the polyvinyl alcohols is generally 2 to 40 mPas, preferably 2 to 15 mPas (Hoppler method at 20° C., DIN 53015). The polyvinyl alcohols mentioned are commercially available and accessible by methods known to those skilled in the art.

Optionally, small amounts of emulsifiers, for example anionic and/or non-ionic emulsifiers, can also be used in the polymerization, for example 0.1 to 2.0% by weight, based on the total weight of the comonomers. Examples of anionic emulsifiers are alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl or alkylaryl sulfonates having 8 to 18 carbon atoms, esters and semiesters of sulfosuccinic acid with monohydric alcohols. Examples of non-ionic emulsifiers are $C_{12}$-$C_{14}$-fatty alcohol ethoxylates having a degree of ethoxylation of 2 to 20 ethylene oxide units. The aqueous dispersions generally have a solids content of 40 to 60% by weight and preferably 45 to 55% by weight. The Brookfield viscosity of the aqueous dispersions is preferably 50 to 2000 mPas, more preferably 100 to 1500 mPas (determined with a Brookfield viscometer at 23° C. at 20 rpm with a solids content of the dispersions of 49 to 51% by weight).

The binder compositions may also comprise one or more additives, for example emulsifiers such as fatty alcohol ethoxylates with low degrees of ethoxylation, in particular 2 to 5, or diisotridecyl sulfosuccinate or salts thereof, such as sodium salts. Typical amounts of emulsifiers used, based on the dry weight of the polymer, are 0 to 1% by weight, preferably 0 to 0.6% by weight. Using emulsifiers, the hydrophilicity of the textile fabrics finished with such binder compositions can be increased.

Further additives are acidic catalysts such as ammonium chloride, citric acid or sulfuric acid. Acidic catalysts are typically added in amounts of from 0 to 2% by weight, preferably 0.1 to 1% by weight, based on the dry weight of the polymer. If the acidic catalysts are Brönstedt acids, as much of these is used so that a pH of preferably 0 to 4 and more preferably 2 to 3 results. Most preferably, no catalysts are used in the aqueous binder composition.

The aqueous binder composition in the form of an aqueous dispersion generally has a solids content of 35 to 65% by weight, preferably 40 to 60% by weight and more preferably 45 to 55% by weight.

The inventive method for producing the textile fabrics is generally carried out by bringing fibers into contact with one or more aqueous binder compositions according to the invention and then drying them. Drying is preferably carried out at temperatures of 160° C., more preferably 120 to 160° C. and most preferably 140 to 160° C.

The fibers are generally based on natural or synthetic, in particular organic, materials. Examples of these are synthetic fibers based on fiber-forming polymers such as viscose, polyester, polyamide, polypropylene, and polyethylene fibers. Examples of natural fiber materials are wood, wool, cotton, jute, flax, hemp, coconut, ramie, sisal fibers and especially cellulose fibers. The fibers can be used loosely or in the form of bundles or woven textiles, yarns or preferably in the form of nonwovens, such as fleeces, scrims or knitted fabrics. The nonwovens can optionally be thermally or mechanically preconsolidated, for example needled.

The fibers can have any length, preferably 5 mm to 100 mm, more preferably 7 mm to 75 mm and most preferably 10 mm to 60 mm. The fibers can have customary diameters, preferably diameters of 0.1 µm to 1 mm, more preferably 0.5 µm to 100 µm and most preferably 1 µm to 50 µm.

To produce the textile fabrics, the aqueous binder composition is preferably used in an amount of 1 to 50% by weight, more preferably 10 to 30% by weight and most preferably 15 to 25% by weight, based in each case on the total weight of the fibers. The proportion of fibers is preferably from 40 to 99% by weight, more preferably from 60 to 90% by weight and most preferably 70 to 80% by weight, based in each case on the total weight of the textile fabrics.

To produce the textile fabrics, the procedure can be such that the fibers are spread out in the form of a sheet before consolidation. The methods for this are known and primarily depend on the application in which the consolidated fiber material is used. The fibers can be laid out, for example, by means of an airlaying, wetlaying, direct spinning or carding device. Optionally, prior to consolidation with binder, mechanical consolidation may also be carried out, for example by cross-laying, needling or water jet consolidation. Subsequently, the binder composition can be applied to the laid-out fibers, it being possible for the binder composition to be applied in areal form, in punctuate form or patternwise. The fibers can then be bonded by applying heat and optionally pressure.

The aqueous binder composition is also suitable for the production of laminates, two fiber layers being glued together or one fiber layer being glued to a further substrate. It is possible to proceed in such a way that one fiber layer is laid out, the binder composition being applied after laying out, and another fiber layer being laid on top, for example by airlaying. Instead of the second fiber layer, another substrate, for example a plastic film, can also be laid on top. Subsequently, the bonding is effected by applying heat and optionally pressure. This procedure makes available, for example, reclaimed cotton insulating materials durably clad with a fiberweb as surfacing material.

The binder compositions are also suitable for the production of lofty nonwovens or waddings used, for example, as semifinished products for the production of moldings from fibrous materials or as padding, insulating and filter waddings. For this purpose, the binder composition can be applied to the fibers and be consolidated by increasing the temperature, preferably in a molding tool.

The textile fabrics produced according to the invention are preferably nonwovens, in particular tissues, felts, waddings or coarse-mesh, loose wovens or knits. The textile fabrics may be used, for example in the automotive sector, for household products such as tablecloths, hygiene articles such as toilet paper, in the clothing industry, for medical textiles or geotextiles.

The following examples serve to further elucidate the invention:

Preparation of the aqueous solution of the copolymer B): 0.05 g of ammonium iron(II) sulfate in 86 g of deionized water were initially charged and the polymerization reactor was flushed with nitrogen and heated to 70° C. A mixture of 81.8 g of a 30% by weight aqueous acrylamide solution, 24.5 g of acrylic acid and 13.6 g of maleic anhydride in 208 g of deionized water was metered into the reactor over 90 minutes. The reaction was started by metering in a 1% by weight aqueous hydrogen peroxide solution and a 3.1% by weight aqueous sodium isoascorbate solution at a rate of 6 ml/h and this rate was maintained for 90 minutes. An aqueous solution of a copolymer having 39% by weight acrylamide units, 39% by weight acrylic acid units and 22% by weight maleic acid units having a solids content of ca. 14% by weight was obtained.

Example 1

Preparation of the Aqueous Dispersion of the Vinyl Acetate Copolymer A) in the Presence of Copolymer B):

In a pressure reactor equipped with stirrer and heating jacket, 400 g of water, 4.1 g of a polyvinyl alcohol having a degree of hydrolysis of 88 mol % and a Hoppler viscosity of 13 mPas, 36.9 g of a polyvinyl alcohol having a degree of hydrolysis of 88 mol % and a Hoppler viscosity of 4 mPas were initially charged, and 0.5 g of citric acid and 0.06 g of ammonium iron(II) sulfate were added. A pH of 4.1 was set by adding further citric acid. Subsequently, the reactor was evacuated and flushed with nitrogen. Then, 591 g of vinyl acetate were added, 229.5 g of ethylene injected and the mixture was heated to 32° C.

A 1% by weight aqueous hydrogen peroxide solution and a 3.1% by weight aqueous sodium isoascorbate solution were each metered in at a metering rate of 5.6 ml/h. At the same time, metered addition of the 14% by weight solution of the acrylamide/acrylic acid/maleic acid copolymer B) was started and 133 g of the aqueous solution were metered in over the course of 150 minutes. The polymerization temperature increased to 70° C. within 50 minutes. 60 minutes after the start of the initiator metered addition, the metered addition of a further 147 g of vinyl acetate over 138 minutes was started and the ethylene pressure was maintained at 68 bar until a further 58 g of ethylene had been injected. On completion of the vinyl acetate metered addition, the metering rates of the initiator metered additions were increased to 15.4 ml/h. Five and a half hours after the start of the metered addition of the initiator, the polymerization was terminated and the pH adjusted to 4.2 using an aqueous ammonia solution. An aqueous dispersion having a solids content of approximately 53% by weight was obtained.

Comparative Example 2

The procedure was analogous to Example 1, with the difference that the 133 g of the 14% solution of the copolymer B) were not added during the polymerization, but were only metered in to the aqueous dispersion of the vinyl acetate-ethylene copolymer after completion of the polymerization.

Comparative Example 3

In analogy to example 1 from the PCT application with the application number PCT/EP2019/052740, an aqueous dispersion (solids content ca. 55%) of a copolymer composed of 77% by weight vinyl acetate, 21% by weight ethylene, 0.8% by weight acrylamide, 0.8% by weight acrylic acid and 0.4% by weight maleic anhydride, stabilized with 10% by weight, based on the total weight of the comonomers, of a polyvinyl alcohol having a Hoppler viscosity of 5 mPas and a degree of hydrolysis of 88 mol %, was prepared.

Comparative Example 4

In analogy to comparative example 5 from the PCT application with the application number PCT/EP2019/052740, an aqueous dispersion (solids content ca. 55%) of a copolymer composed of 78% by weight vinyl acetate, 21.2% by weight ethylene and 0.8% by weight N-methylolacrylamide, stabilized with 10% by weight, based on the total weight of the comonomers, of a polyvinyl alcohol having a Hoppler viscosity of 5 mPas and a degree of hydrolysis of 88 mol %, was prepared.

Determination of the wet strength values for airlaid nonwovens:

The polymer dispersion of the particular (comparative) example, diluted with water to a solids content of 20%, was sprayed homogeneously onto both sides of a thermally pre-bonded airlaid fleece (75 g/m$^2$; 88% fluff pulp and 12% PP/PE bicomponent fibers; 0.85 mm thickness) with a spray liquor using a semi-automatic spray assembly according to the airless process (slot nozzle Unijet 8001 E; 5 bar) and then dried in a laboratory through-air dryer (Mathis LTF; Mathis/CH) for 3 min at 160° C. (application amount: 20% by weight polymer based on the total weight of polymer and fleece).

For each tensile strength test, 6 fleece strips (25 cm fleece strip length; 5 cm fleece strip width) were prepared in the cross direction to the machine production direction. To measure the wet tensile strengths, the strip samples were each stored in a 1% aqueous solution of Aerosol-OT 75E (sodium dioctyl sulfosuccinate from Solvay) for 15 s prior to the measurement. The wet tensile strengths were determined in accordance with DIN EN 29073 (Part 3: Test method for nonwovens, 1992) and the test samples by means of a maximum tensile force measurement on a Zwick® 1445 testing machine (100 N load cell) using TestXpert® software version 11.02 (from Zwick Roell) at a clamping length of 101.6±1 mm (=4 inches), a clamping width of 50±1 mm and at a deformation speed of 150 mm/min.

The results of the testing are summarized in table 1.

TABLE 1

| Example | AA (%) | AAc (%) | MA (%) | NMA (%) | Wet strength (g/5 cm)*** |
|---|---|---|---|---|---|
| Example 1 | 0.8* | 0.8* | 0.4* | 0.0 | 1353/1200 |
| Comp. Ex. 2 | 0.8* | 0.8* | 0.4* | 0.0 | 734/616 |
| Comp. Ex. 3 | 0.8** | 0.8** | 0.4** | 0.0 | 1170/1120 |
| Comp. Ex. 4 | 0.0 | 0.0 | 0.0 | 0.8** | 1020/1570 |

*= as copolymer B)
**= copolymerized with vinyl acetate and ethylene
***= without catalyst/with 1% citric acid as catalyst The comparison of example 1 with comparative example 3 shows that with a "prepolymer" (copolymer B) composed of acrylamide, acrylic acid and maleic acid units, an improvement in the strength values is obtained compared to a vinyl acetate-ethylene copolymer comprising these monomer units in the copolymer (comparative example 3).

The comparison of example 1 with comparative example 2 shows that this improvement is only obtained when the copolymer B) (prepolymer) is present in the polymerization mixture during the production of the vinyl acetate-ethylene copolymer (example 1) and not when it is subsequently added (comparative example 2).

The comparison of example 1 with comparative example 4 shows that high wet strengths are obtained with the binder according to the invention even without crosslinking NMA units and even without a catalyst.

The invention claimed is:

1. An aqueous binder composition for binding fibers comprising a vinyl acetate-ethylene copolymer A), obtained by radically initiated polymerization of a1) 60 to 94% by weight vinyl acetate, a2) 5 to 30% by weight ethylene and a3) 0 to 20% by weight of further ethylenically unsaturated comonomers copolymerizable therewith, in the presence of polyvinyl alcohol in aqueous medium, wherein the polymerization is carried out in the presence of a copolymer B) having b1) 20 to 50% by weight of monomer units derived from ethylenically unsaturated carboxamides, b2) 20 to 50% by weight of monomer units derived from ethylenically unsaturated monocarboxylic acids, b3) 20 to 50% by weight of monomer units derived from ethylenically unsaturated dicarboxylic acids or anhydrides thereof, where the figures in % by weight for the monomers a1), a2) and a3) total 100% by weight, and the figures for % by weight for the monomer units b1), b2) and b3) total 100% by weight.

2. The aqueous binder composition of claim 1, wherein a1) 70 to 85% by weight vinyl acetate, based on the total weight of the monomers a1), a2) and a3), are copolymerized.

3. The aqueous binder composition of claim 1, wherein a2) 15 to 28% by weight ethylene, based on the total weight of the monomers a1), a2) and a3), are copolymerized.

4. The aqueous binder composition of claim 2, wherein a2) 15 to 28% by weight ethylene, based on the total weight of the monomers a1), a2) and a3), are copolymerized.

5. The aqueous binder composition of claim 1, wherein the vinyl acetate-ethylene copolymer A) does not contain any N-methylol(meth)acrylamide units or N-(alkoxymethyl)(meth)acrylamide units.

6. The aqueous binder composition of claim 1, wherein the copolymer B) comprises monomer units b1) of one or more monomers selected from the group consisting of acrylamide, methacrylamide and maleamic acid.

7. The aqueous binder composition of claim 1, wherein the copolymer B) comprises monomer units b2) of one or more monomers selected from the group consisting of acrylic acid and methacrylic acid.

8. The aqueous binder composition of claim 1, wherein the copolymer B) comprises monomer units b3) of one or more monomers selected from the group consisting of maleic anhydride and maleic acid.

9. The aqueous binder composition of claim 1, wherein the copolymer B) is present in an amount of 0.5 to 15% by weight, based on the total weight of the comonomers a1), a2) and a3).

10. A process for producing an aqueous binder composition of claim 1, comprising polymerizing, by radically initiated polymerization, a1) 60 to 94% by weight vinyl acetate, a2) 5 to 30% by weight ethylene, a3) 0 to 20% by weight of further ethylenically unsaturated comonomers copolymerizable therewith, in the presence of polyvinyl alcohol in aqueous medium, wherein the polymerization is carried out in the presence of a copolymer B) having b1) 20 to 50% by weight of monomer units derived from ethylenically unsaturated carboxamides, b2) 20 to 50% by weight of monomer units derived from ethylenically unsaturated monocarboxylic acids, b3) 20 to 50% by weight of monomer units derived from ethylenically unsaturated dicarboxylic acids or anhydrides thereof, where the figures in % by weight for the monomers a1), a2) and a3) total 100% by weight, and the figures in % by weight for the monomer units b1), b2) and b3) total 100% by weight.

11. The process of claim 10, wherein the copolymer B) is initially charged as a whole prior to the start of the polymerization or is initially charged in part and the remainder is metered in during polymerization.

12. The process of claim 10, wherein in an upstream step the comonomers b1), b2) and b3) are polymerized in situ in aqueous solution to form the copolymer B), and then the polymerization to produce the vinyl acetate-ethylene copolymer A) is initiated without isolating the copolymer (B).

13. A textile fabric, bound by an aqueous binder composition of claim 1.

14. The textile fabric of claim 13, wherein fibers are brought into contact with the aqueous binder composition and are then dried.

15. The textile fabric of claim 13, wherein no catalysts are present in the aqueous binder composition.

16. In a process for preparation of a textile fabric bound by a polymeric binder, the improvement comprising employing an aqueous binder composition of claim 1 as a polymeric binder.

\* \* \* \* \*